United States Patent [19]

Wehrer

[11] Patent Number: 5,164,714
[45] Date of Patent: Nov. 17, 1992

[54] MODULATED TOUCH ENTRY SYSTEM AND METHOD WITH SYNCHRONOUS DETECTION

[75] Inventor: Wayne J. Wehrer, Austin, Tex.

[73] Assignee: AMP Incorporated, Harrisburg, Pa.

[21] Appl. No.: 569,242

[22] Filed: Aug. 16, 1990

Related U.S. Application Data

[63] Continuation of Ser. No. 209,248, Jun. 20, 1988, abandoned.

[51] Int. Cl.⁵ .............................................. G09G 3/02
[52] U.S. Cl. ..................................... 340/712; 341/20; 250/221
[58] Field of Search ................... 340/706, 712; 341/20, 341/31; 178/18, 19; 250/221

[56] References Cited

U.S. PATENT DOCUMENTS

| | | | |
|---|---|---|---|
| 3,704,396 | 11/1972 | MacDonald | 317/124 |
| 3,867,628 | 2/1975 | Brown | 250/206 |
| 3,970,846 | 7/1976 | Schofield, Jr. et al. | 250/221 |
| 4,243,879 | 1/1981 | Carroll et al. | 250/221 |
| 4,267,443 | 5/1981 | Carroll et al. | 250/221 |
| 4,591,710 | 5/1986 | Komadina et al. | 341/31 |
| 4,684,801 | 8/1987 | Carroll et al. | 250/221 |
| 4,719,339 | 1/1988 | Mizuno | 250/221 |
| 4,725,726 | 2/1988 | Hasegawa et al. | 250/221 |
| 4,855,590 | 8/1989 | Bures et al. | 340/712 |
| 4,904,857 | 2/1990 | Ando et al. | 250/205 |
| 4,943,806 | 7/1990 | Masters et al. | 340/712 |

FOREIGN PATENT DOCUMENTS 0181612 5/1986 European Pat. Off.
2178166 2/1987 United Kingdom.

Primary Examiner—Ulysses Weldon
Assistant Examiner—M. Fatahiyar
Attorney, Agent, or Firm—Robert W. Pitts; Anton P. Ness

[57] ABSTRACT

A modulated touch entry system and corresponding method for detecting the presence and location of a member within an irradiated field. A touch entry system and corresponding method are disclosed which utilize modulated pulses of light from light emitters, such as light emitting diodes, which are detected by corresponding light detectors, such as phototransistors. The light emitters and the corresponding light detectors are arranged around a frame to provide an irradiated field. The system utilizes circuitry to precondition a signal from the light detectors prior to analyzing the presence of a "hit"; i.e., the presence of a member within the irradiated field. The circuitry includes a differential amplifier and a programmable amplifier, which consists of a digital to analog converter, a current to voltage converter, and a gain stage, to precondition the signal from the light detectors. The portion of the circuit which detects the modulation of the signal from the light detectors is synchronized with the frequency of the modulation of the light pulses so that it detects the presence or absence of modulated light pulses. A filter portion of the circuit for providing an appropriate output signal is also disclosed, as is a circuit for sampling the ambient light strength and selectively disabling the modulation detection circuit when ambient light strength exceeds a preselected value.

19 Claims, 8 Drawing Sheets

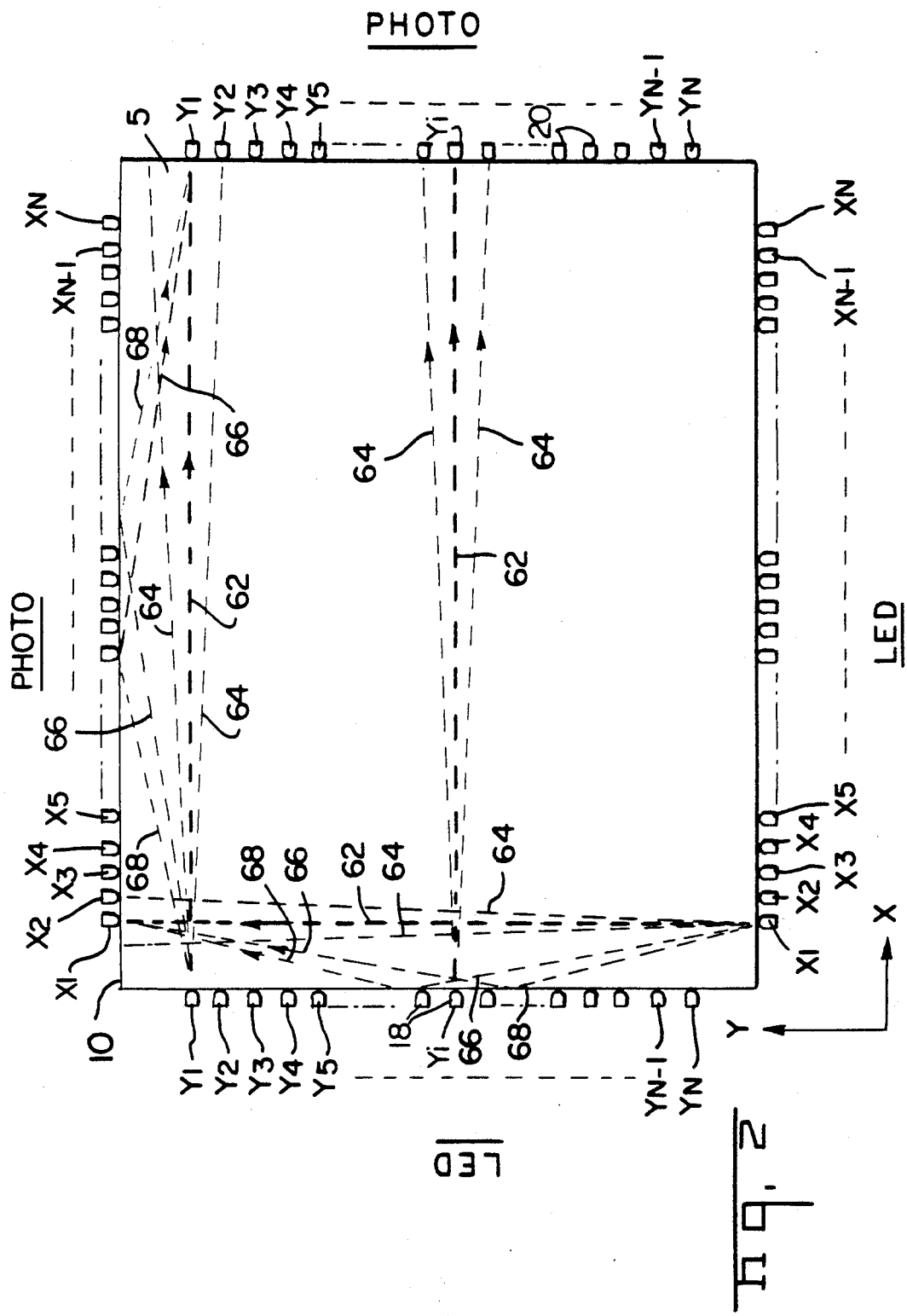

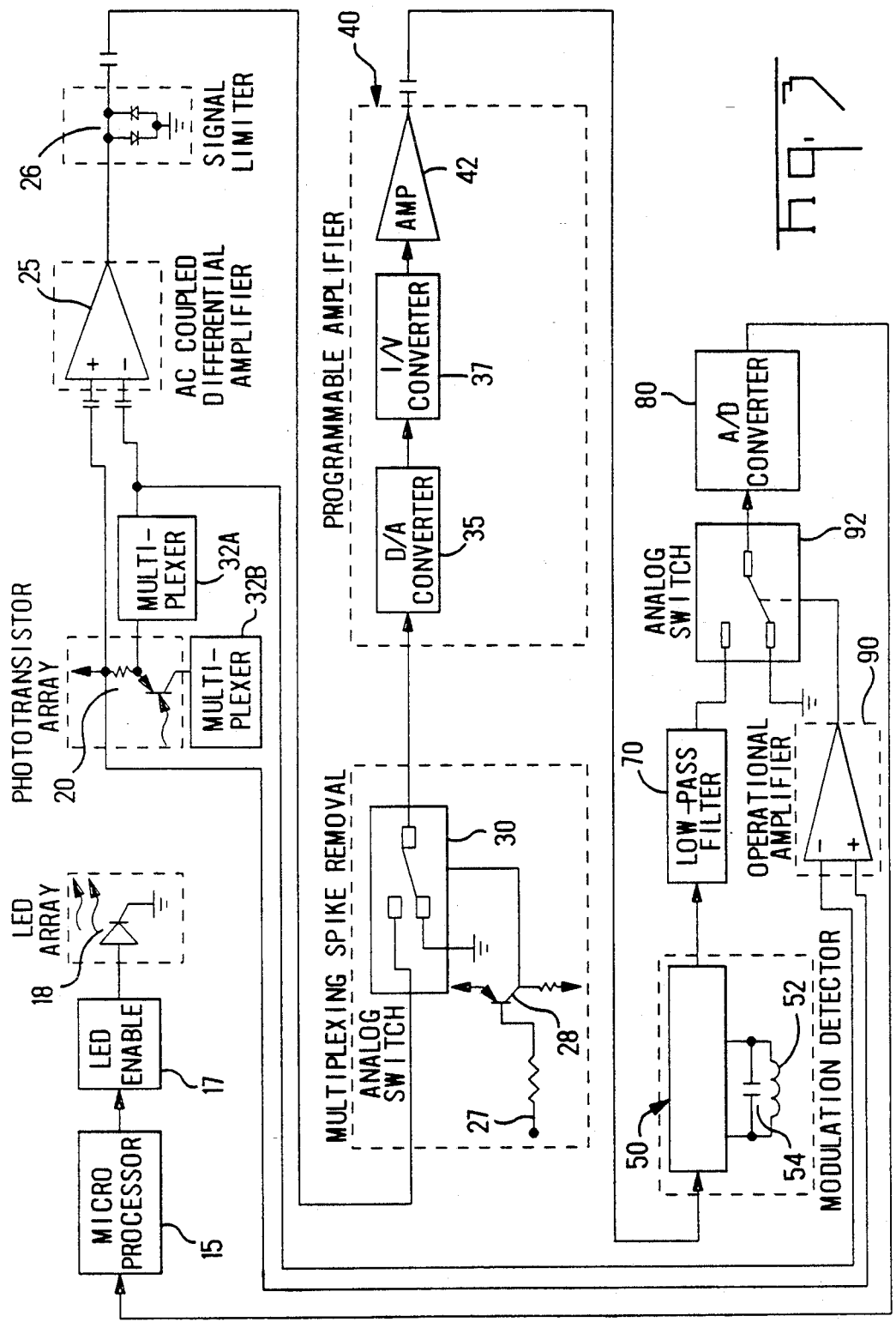

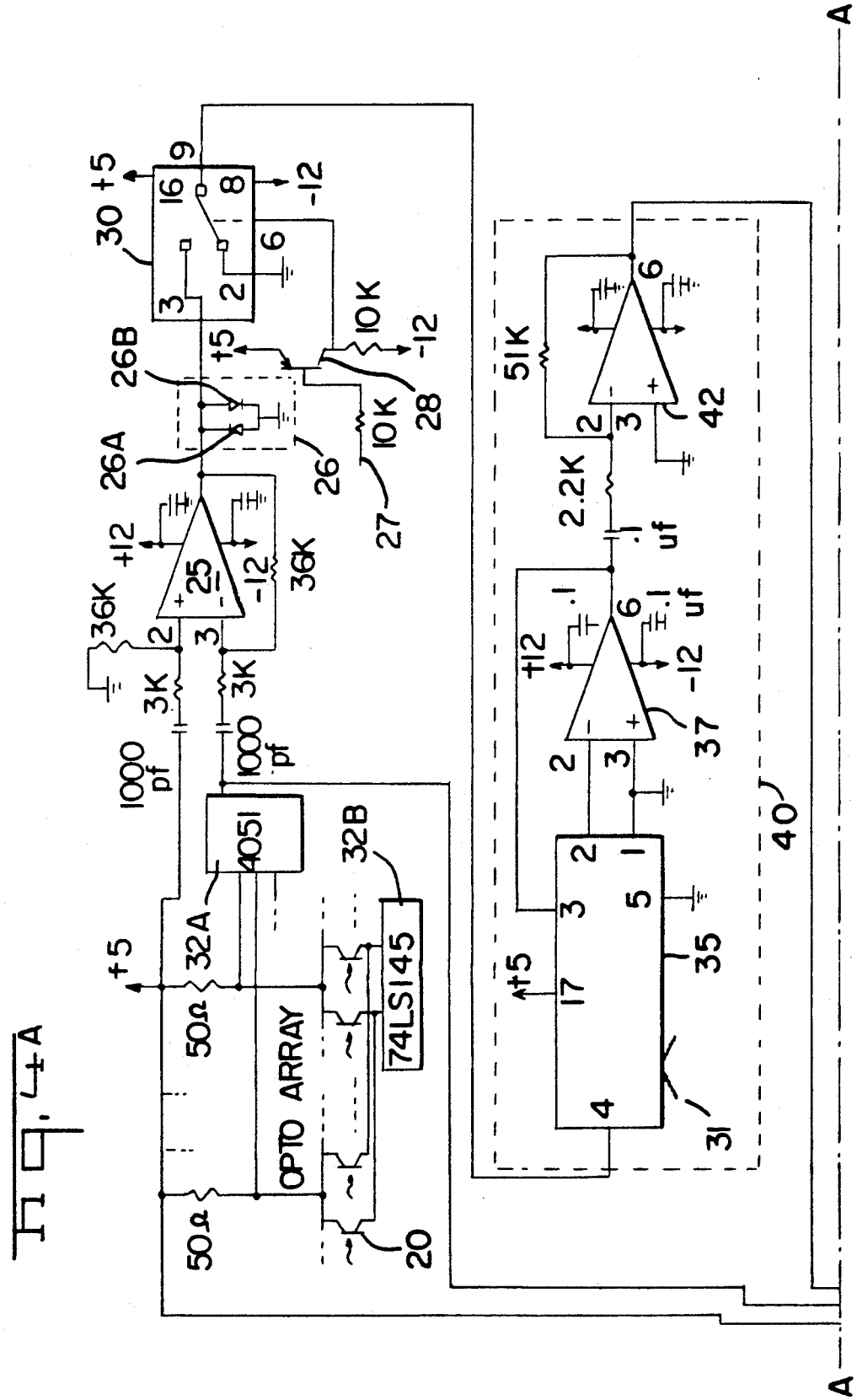

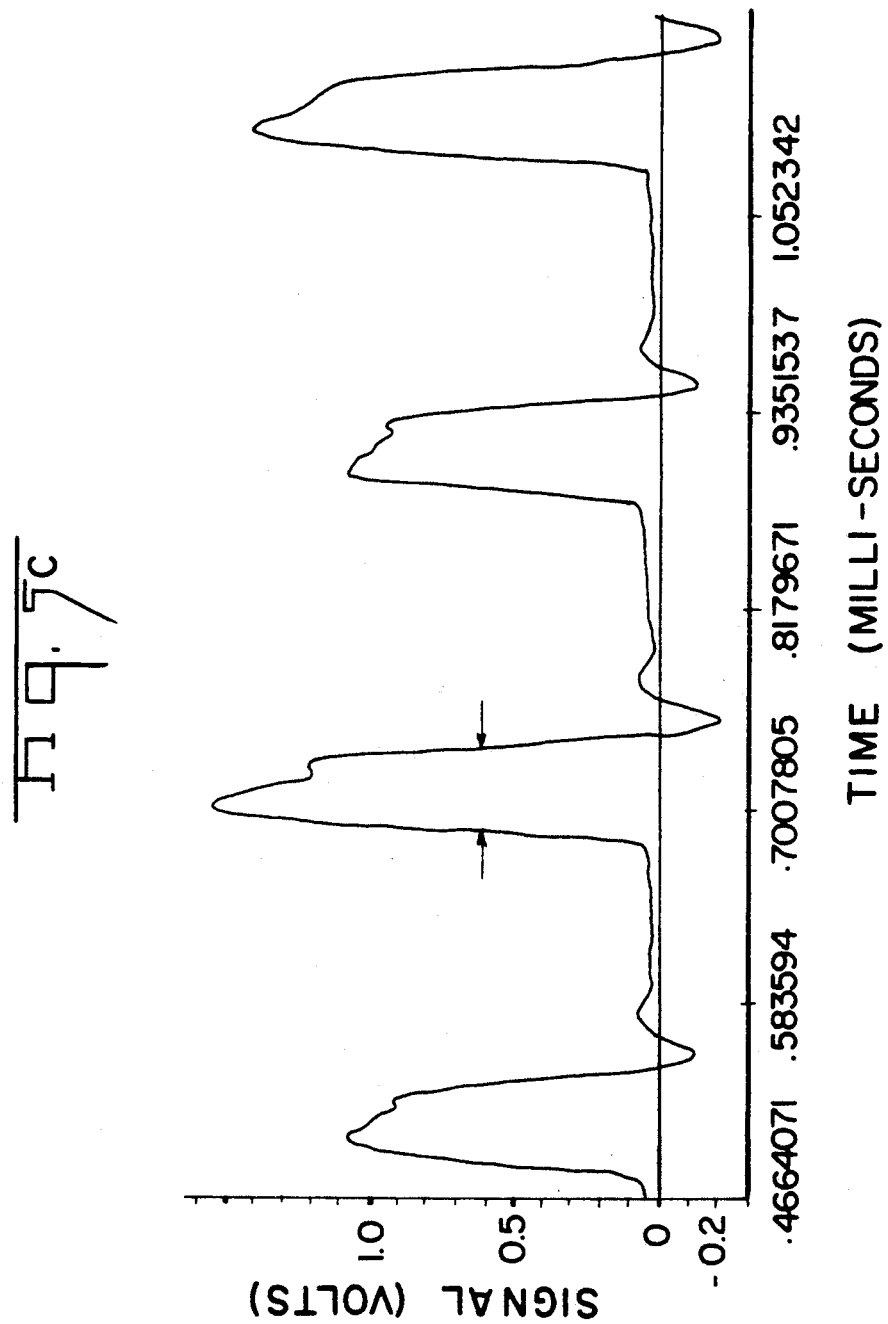

MODULATED TOUCH ENTRY SYSTEM AND METHOD WITH SYNCHRONOUS DETECTION

This application is a continuation of application Ser. No. 07/209,248 filed Jun. 20, 1988, now abandoned.

FIELD OF THE INVENTION

This invention relates to a modulated touch entry system for detecting a member interrupting one or more optical beams transmitted between emitters and associated detectors in an irradiated field, and more particularly, to a touch entry system for detecting the intrusion and relative location of an element within an irradiated field generally adjacent to an electronic display formed by a plurality of infrared light emitter and light detector pairs with modulated light pulses with the frequency of the light pulses.

BACKGROUND OF THE INVENTION

Along with the continued and increasing use of video displays has been the problem of the man/machine interface. Traditionally, control of displayed information or cursors has been via the use of a keyboard. More recently, however, a number of devices have been introduced which allow an operator to directly interact with a video display. These devices have included light pens, desk-type mouse controllers, or touch input devices, such as a switch matrix or opto-electronic matrices. While switch-type overlays, placed adjacent a video display, are generally inexpensive to apply and to utilize, they are also susceptible to contact wear as well as the distortion of the video information which is presented to the viewer or operator, particularly in situations involving a high degree of use. Opto-matrix schemes utilizing light which is generally in the infrared region, however, create a switch matrix which is invisible to the viewer or operator and, therefore, does not distort the video information displayed and is not subject to wear in high use environments. Systems utilizing opto-matrix frames are well known in the art. Examples of such systems include U.S. Pat. No. 4,267,443, entitled "Photoelectric Input Apparatus," issued May 12, 1981, to Carroll, et al., and U.S. Pat. No. 4,684,801, issued Aug. 4, 1987, to Carroll, et al., entitled "Signal Preconditioning For Touch Entry Device."

Such systems address problems inherent with the use of opto-matrix devices such as increasing frame resolution without a corresponding increase in the number of components used, surrounding or ambient light compensation, and the optimization of emitter/detector driving and detecting networks. Such systems, however, still have drawbacks. For example, the use of a large number of components results in higher costs. Additionally, some systems exhibit difficulty in compensating for reflection or glare, which sometimes results in the failure of the system to detect a touch or hit.

Glare problems generally occur when an emitter is adjacent a corner of a frame or bezel so that, when the emitter produces light, the light so produced bounces off an adjacent surface and is then detected by a detector corresponding to the emitter. A stylus or other object which is introduced to the video display may block the majority of the light received by the detector, but the amount of reflected light or glare may be sufficiently great whereby the detector and the system do not detect a hit or the presence of an element.

Ambient light also results in significant problems in such touch entry systems. Several systems for compensating for ambient light problems have been proposed and are marketed in touch entry systems. For example, U.S. Pat. No. 4,267,443, entitled "Photoelectric Input Apparatus," issued May 12, 1981, to Carroll, et al., discloses an ambient light sampling system. Additionally, U.S. Pat. No. 4,243,879, entitled "Touch Panel with Ambient Light Sampling," issued Jan. 6, 1981, to Carroll, et al., discloses an ambient light sampling system in a touch entry system.

It is desirable to have a touch entry system which minimizes the number of components necessary for addressing and sampling light emitters and light detectors. It is also desirable that the device dynamically compensate for ambient light effects and for variations in emitter light output and detector sensitivity. At the same time, however, the device should employ a minimal number of components. Accordingly, it is an object of the present invention to provide a touch entry system which minimizes the number of components necessary for accurately addressing and sampling light detectors and light emitters surrounding an irradiated field.

Other ambient light compensation systems have required the use of large amounts of energy to drive light emitting devices, such as infrared light emitting diodes (LED's), in order to ensure that the intensity of the light emitted by the LED's is greater than the intensity of the ambient light. Such an approach requires the use of expensive light emitting and light detecting elements. Such an approach also requires that even high performance LED's and phototransistors be operated outside normal operating ranges.

The use of modulated light pulses in a touch entry system allows more accuracy and confidence in the determination of whether or not an element is present in the field and blocking one or more light detectors. The frequency of the light pulses emitted by the light emitters in such a system can be preselected easily so that the pulse frequency is markedly different from the various frequencies of ambient light usually present in a variety of environments.

It is an object of the invention to provide a touch entry system which utilizes modulated light pulses to provide increased accuracy and confidence in the determination of the presence of an element in an irradiated field.

It is a still further object of the invention to provide a practical touch entry device comprising a four-sided substantially rectangular frame with optical emitters and detectors disposed in the sides of the frame with a device for sequentially sampling and activating the light detectors and light emitters.

A still further object of the invention is to provide a cost effective device to overcome ambient light problems in a touch entry system by utilizing and detecting modulated light pulses.

It is a still further object of the invention to provide a touch entry system which compensates for ambient light effects which is easily manufactured and produced with a minimum number of components and at a minimal cost.

SUMMARY OF THE INVENTION

The invention consists of a touch entry system which detects the presence of an object in an irradiated field formed by arrays of light emitting elements (or light emitters) and light detecting elements (or light detectors). The invention utilizes a control system which selectively activates the light emitters and light detectors. When activated, the light emitters emit light pulses of a preselected frequency. The invention utilizes a modulation detector which is selectively tuned to be substantially synchronous with the preselected frequency of the light pulses from the light emitters and different electrical elements are used to precondition a signal before the signal is analyzed by the modulation detector. Other embodiments of the invention are disclosed and claimed.

BRIEF DESCRIPTION OF THE DRAWINGS

FIG. 2 is a view of an optical matrix frame with light emitters and light detectors around its perimeter and illustrating the opto-matrix light beams.

FIG. 3 is a block diagram of the elements in a preferred embodiment of the invention.

FIGS. 4A and 4B are detailed schematic diagrams of the elements shown in FIG. 3 and also of a circuit for measuring ambient light strength and selectively disabling the output signal of the invention.

FIGS. 5A, 5B, and 5C, respectively, are timing diagrams of the signal from the light detectors after amplification, the output signal from modulation detector 50, and the output signal after filtering.

DETAILED DESCRIPTION OF THE PREFERRED EMBODIMENT

Figure 1:
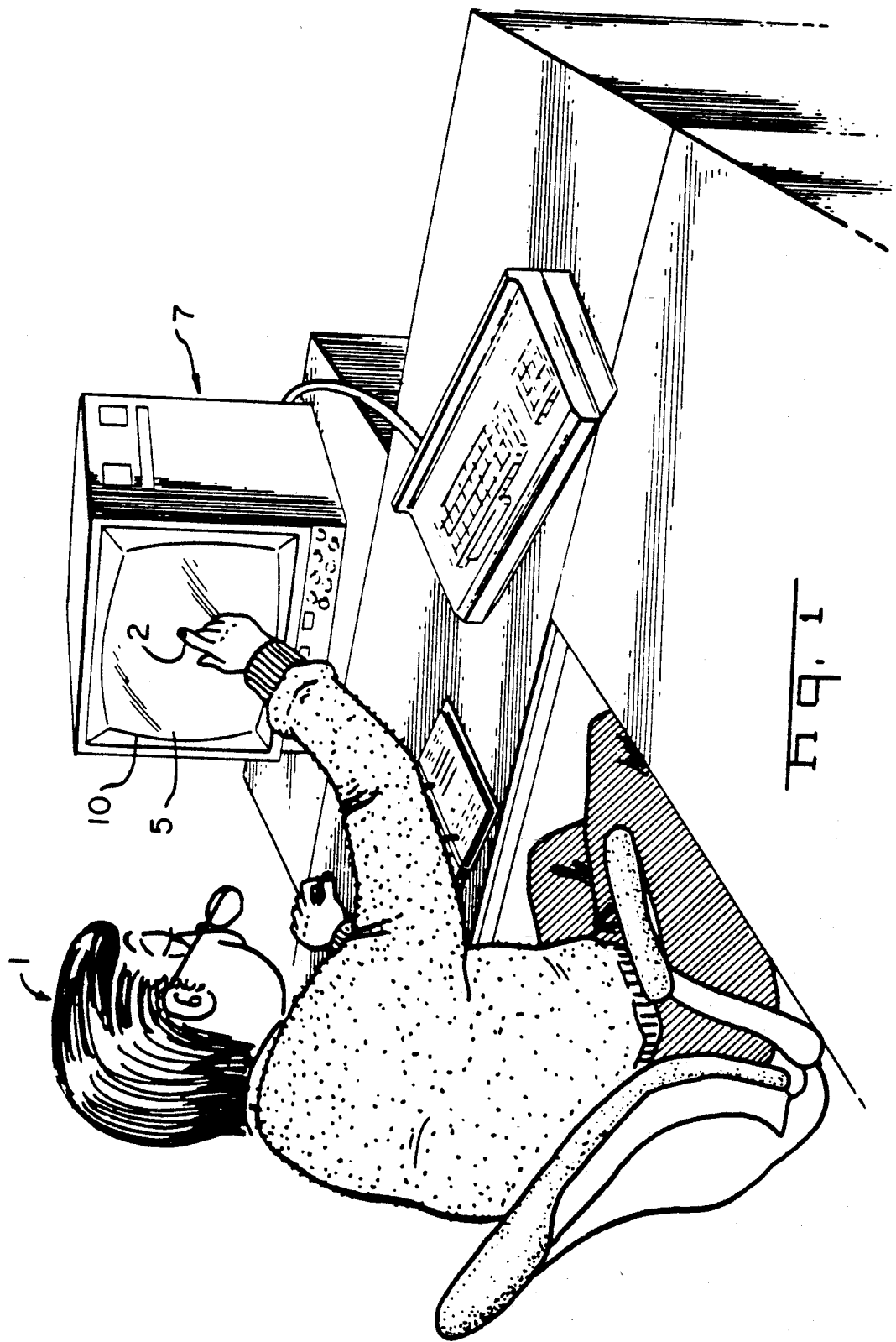
FIG. 1 is a drawing of an operator utilizing a touch entry system.

FIG. 1 shows the manner in which an operator can interact directly with the information shown on a display 5 of a CRT 7 of the type which is commonly used in connection with a host computer, which is often a personal computer. The preferred embodiment of this invention is intended to provide real time inputs to a microcomputer, such as the types of personal computers which are commercially available. As such, the information provided by the invention could be input directly to the host computer or could be adapted to process information which could be input to a host computer through an RS232 interface in a more conventional manner. Such an interface is well-known to those skilled in the art and can, for example, consist of a combination of a Motorola MC1488 and a MC189.

As shown in FIG. 1, an operator 1 can interact directly with a CRT 7, which is displaying information on a display 5 simply by directly touching specific locations on the display 5. Located on the perimeter of display 5 are a plurality of light emitting elements, such as infrared light emitting diodes (LED's) 18 and light detecting elements, such as phototransistors. The light emitters and light detectors are easily mounted in a bezel or frame 10, which is located around the perimeter of display 5 in a conventional manner and which is easily detached from CRT 7. The location of light emitters 18 and light detectors 20 in frame 10 around the perimeter of display 5 allows a plurality of infrared light beams emitted by light emitters 18 to scan display area 5.

When operator 1 places a probe 2 at a specific location on display 5, one or more infrared beams extending between corresponding light emitters and light detectors disposed in frame 10 would be interrupted. As shown in FIG. 1, probe 2 may be an operator's finger. However, probe 2 may consist of an extremely wide variety of items, including a pencil, pen, or any opaque element. The unique location of the probe 2 is then transmitted to a host computer. More generally, this invention provides a means by which an opaque element, such as a probe 2 or other styli, could be detected when disposed within an irradiated field which is formed by the light beams emitted by light detectors 18 across display 5. The irradiated field surrounding display 5 is formed by positioning light emitters 18 and light detectors 20 around the perimeter of display 5 on frame 10, as shown in FIG. 2, with the individual light emitters being aligned with corresponding individual light detectors.

FIG. 2 shows arrays of light emitting devices or light emitters 18 and arrays of light detecting devices or light detectors 20 disposed around the periphery of an irradiated field adjacent display 5. A touch input device with a substantially rectangular field adjacent display 5, as depicted in FIG. 2, when used with display 5 of CRT 7, would be configured in this manner, with two orthogonal arrays of light emitters 18 and two orthogonal arrays of light detectors 20 disposed along the sides of a substantially rectangular display 5. Light emitting diodes and phototransistors are commonly used as light emitters 18 and light detectors 20 in such touch input or touch entry systems, although it should be understood that other light emitting devices and light detecting devices could be suitably employed. As shown in FIG. 2, a Y array of light emitters 18, such as light emitting diodes (LED's), $Y_1$ through $Y_N$, are located along the left of the frame 10 surrounding the display area 5 or irradiated field. A similar array of light emitting diodes, $X_1$ through $X_N$, is located along the bottom of frame 10, as oriented in FIG. 2. Arrays of light detectors 20 phototransistors, $Y_1$ through $Y_N$, located along the right, and $X_1$ through $X_N$, located along the top of frame 10 are disposed such that individual corresponding light emitters 18 and light detectors 20 (respectively LED's and phototransistors), such as $X_1$—$X_1$ and $X_2$—$X_2$ and $Y_1$—$Y_1$ and $Y_2$—$Y_2$, are aligned. Thus, when light is emitted by an individual light emitter 18, such as $X_1$, this light will be incident upon a corresponding aligned light detector 20 such as phototransistor $X_1$.

FIG. 2 also shows, however, that the light emitted by individual light emitters 18 is incident not only upon the corresponding aligned light detectors 20, but is also incident upon adjacent light detectors 20. Note that while the light emitted along centerline 62 from light emitter $Y_i$ will be incident on an aligned light detector $Y_i$, light emitted along line 64, within the dispersion angle of conventional light emitters 18, will be incident upon adjacent light detectors $Y_{i-1}$ and $Y_{i+1}$. Light indicated at 66 and 68 might also be incident upon sides of frame 10 causing certain glare and reflection problems in practical touch entry systems. A common method of ensuring that light emitted by a given light emitter 18 is detected only by the corresponding light detector 20, and not by an adjacent light detector, is to sequentially activate light emitters 18 and sequentially scan the arrays of light detectors 20. In other words, when a given light emitter 18 is activated and emits light, only the aligned light detector 20, and not adjacent light detectors, is activated. Thus, activation of light emitter $X_1$ would occur at the same time that light detector $X_1$ is activated to detect incident light. The adjacent light detector $X_2$, upon which light from light emitter $X_1$ would also be incident, would not be turned on during the interval in which light emitter $X_1$ is activated. Note that this sequential activation of light emitters 18 and light detectors 20 permits accurate detection of the presence of an opaque element or probe 2 positioned between aligned light emitters 18 and light detectors 20. A light detector 20 which is blocked by opaque element or probe 2 disposed in the field will not detect light from a light emitter 18 adjacent the corresponding light emitter, simply because that light emitter will not be turned on during the activation interval of the "blocked" light detectors.

In addition to detection by individual light detectors 20 of incident light from corresponding aligned light emitters 18, the light detectors would also detect incident ambient light. In conventional detection systems, the intensity of the incident light from an aligned light detector is measured, either in addition to ambient light or by first electrically subtracting or compensating the electrical signal due to the incident ambient light. In the present invention, each light emitter 18 is pulsed at a preselected frequency during its activation interval and the characteristic pulse signature, frequency, or number of pulses is detected by the corresponding light detector 20 during that activation interval to determine if the detected light is truly from the activated light emitter 18. In other words, the signal from each light emitter 18 is modulated, and only detection of this modulated signal will establish that the particular beam is not blocked. If the modulated signal is not detected during the activated signal interval for a particular light emitter 18, then a probe 2 or stylus must be blocking the particular emitter-detector pair, thus establishing the presence of an opaque element or probe 2 (a "hit") at a specific location within the irradiated field adjacent display 5.

The use of a microprocessor 15 to control the activation and scanning of an opto array of light emitters 18 and light detectors 20 is well known to those skilled in the art. For example, U.S. Pat. No. 4,684,801, issued on Aug. 4, 1987 to Carroll et al., which is hereby incorporated by reference as if fully set forth herein, discloses the use of a microprocessor and appropriate electric circuitry to sequentially activate light emitters and corresponding light detectors. For best results, I prefer a "scan rate" sufficiently high to ensure about twenty scans per second around frame 10 in order to avoid the possibility of not detecting a valid "hit." A hit which is not valid could occur, for example, when an operator 1 unintentionally inserts a second finger into the irradiated field.

In addition, microprocessor 15 can activate light emitters 18 at a specific frequency, such as 100 KHz. For best results, I prefer to use a frequency of about 100 KHz, although such modulation may be in the range of approximately 90 to 110 KHz. The scanning and/or selective modulation under the control of the microprocessor 15 could be performed by a hardware configuration instead of by utilizing software; such an approach, however, is less desirable because more costly.

FIG. 3 shows a block diagram of basic elements used in the preferred embodiment of the invention. Microprocessor 15 controls the activation of the light emitting diodes (LED's) through LED enable 17, and receives information from the signal detection circuitry. Individual LED's in the array are modulated at a relatively high frequency (approximately 100 KHz) to generate the beams of light between the aligned emitter detector pairs. As shown in FIG. 3, the opto array of light detectors 20 is electrically connected to an ac coupled differential amplifier 25. Best results have been achieved by providing a low level of impedance to the signal from the opto array of light detectors 20. A low level of impedance on the order of 50 ohms is important for at least two reasons. First, the low impedance allows the invention to operate over a wider range of ambient light signals without saturation of the circuit components. Because the current from light detectors 20 is a function of the strength of the ambient light, stronger ambient light makes saturation of the circuit more likely. By lowering the impedance, however, the resulting voltage, which is a function of the current from light detectors 20 and the amount of impedance, is lower and less likely to cause saturation. A second reason why a low impedance is important is that, by lowering the value of the resistors and the impedance, the phototransistor response speed is higher. When a high modulation frequency is used, effective performance requires that the phototransistors respond at the required frequency.

Typically, the gain from differential amplifier 25 is twelve. The output signal of differential amplifier 25 passes through signal limiter 26 and is input into an analog switch 30 for removing multiplexing spikes in the signal's amplitude which are caused when the signal processing circuitry switches between pairs of light emitter 18 and light detectors 20. As shown in FIG. 3, a signal is fed into transistor 28 from line 27. This signal on line 27 is a complement of the light emitter 18 enable signal. Transistor 28 is connected to analog switch 30 as shown and allows the level shifting needed so that a 0 to +5 volt signal from line 27 can control analog switch 30, which operates between +5 and −12 volts.

Referring still to FIG. 3, the output signal from switch 30 is input to a programmable amplifier 40. Programmable amplifier 40, as shown in detail in FIG. 4A, consists of a combination of a multiplying digital to analog (D/A) converter 35, a current to voltage converter 37, and a gain stage 42, with the analog output signal of D/A converter 35 fed into current to voltage converter 37, which in turn, is fed into gain stage 42.

Referring now to FIG. 3, the output signal from programmable amplifier 40 is then analog input into a modulation detector 50. For best results, modulation detector 50 consists of a tuned low level video detector of a type which is commercially available. Such a modulation detector 50 consist of a Motorola MC1330A Low Level Video Detector. The configuration of modulation detector 50 in the preferred embodiment of the invention is discussed in more detail below.

Referring now to FIGS. 3 and 4, the output signal from modulation detector 50 is next filtered by a fourth order low pass filter 70. Filter 70 can consist of two second order low pass filters or may be replaced with only a second order low pass filter. The output signal after filtering is then fed into an analog switch 92. Analog switch 92 is also connected to an operational amplifier 90 which, in turn, is connected to the opto array of light detectors 20. The output signal of analog switch 92 is input to an analog to digital (A/D) converter 80, the output of which is then provided to and processed by the microprocessor 15.

Figure 4B:
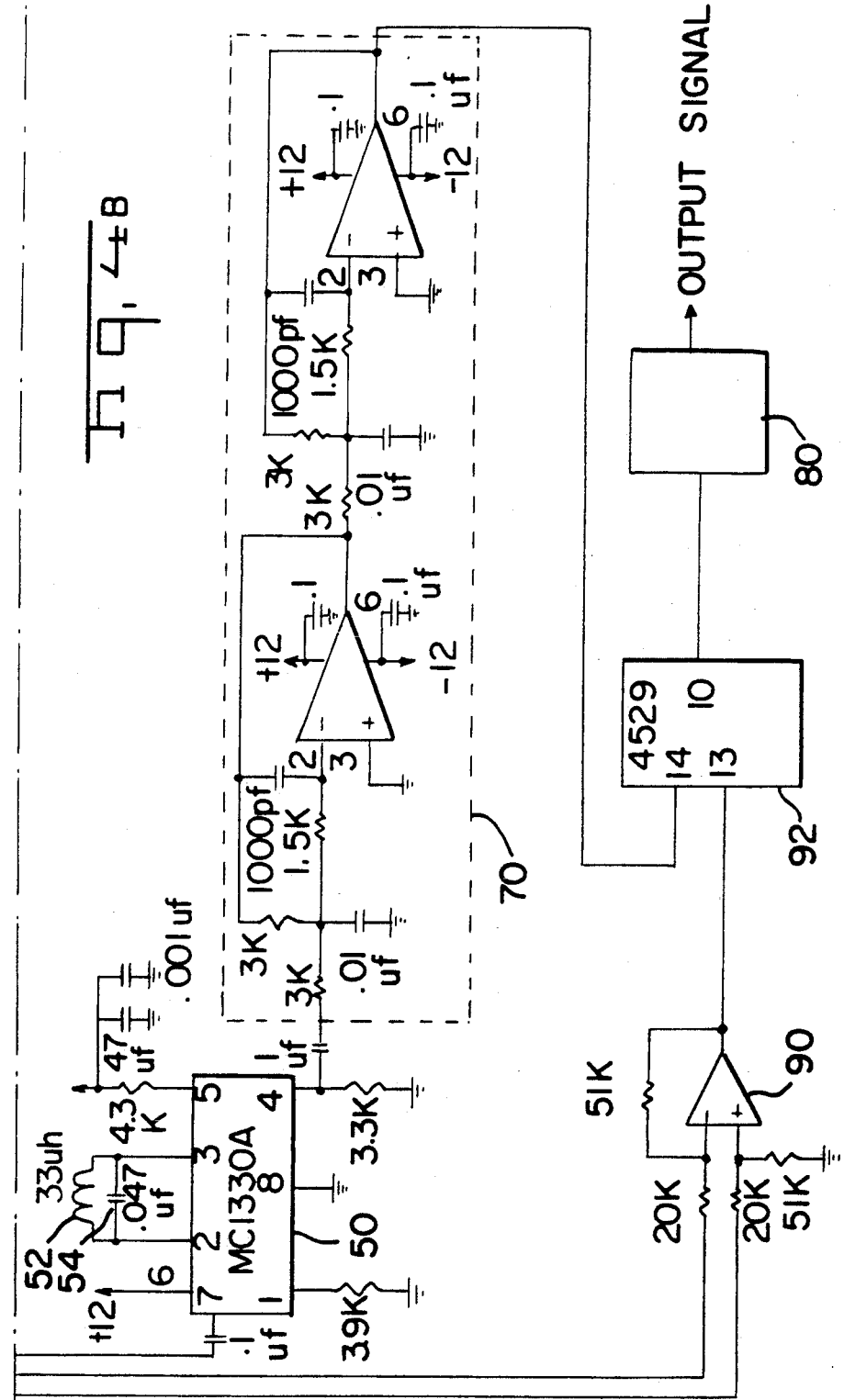

FIGS. 4A and 4B are schematic diagrams of the elements shown in the block diagram of FIG. 3. FIGS. 4A and 4B detail the appropriate resistors, capacitors, voltage connections and pin connections in a preferred embodiment of the invention. Other values and connections could also be utilized with good results. As shown in FIG. 4A, the light detectors 20 in the opto array are connected to the inverting input of differential amplifier 25 and are connected to multiplexers 32A, 32B. Multiplexers 32A, 32B are of a type which is commercially available and their selection would be obvious to one skilled in the art. Multiplexers 32A, 32B are used to selectively activate light detectors 20. Prior to input into differential amplifier 25, the collectors of the phototransistors (used to perform as light detectors 20) are connected to a 0.001 microfarad capacitor and a 3,000 ohm resistor. Differential amplifier 25 reduces the effects of common mode noise. I have found that good results are obtained when differential amplifier 25 is connected so that it has a gain of 12, although good results may be obtained with other gain levels. I have also found that a Signetics NE5534 operational amplifier performs well as differential amplifier 25.

Referring still to FIG. 4A, the output of differential amplifier 25 is connected with a signal limiter 26, which consists here of the connection of diodes 26A, 26B, as shown in FIG. 4A, between ground and the output signal of differential amplifier 25. This limits the signal's voltage excursions to plus or minus a single diode drop voltage of 0.7 volts. The output of differential amplifier 25 is also connected to analog switch 30. Analog switch 30 is of type which is commercially available (such as the CD4529), and is used to remove spikes in the signal amplitude which result from multiplexing between pairs of light emitters 18 and light detectors 20, which are shown in FIG. 2.

As detailed in FIG. 4A, line 27 provides analog switch 30 with a signal which is fed to analog switch 30 via transistor 28, with the resistor and voltage connections as shown. The signal on line 27 is the complement of the enabling signal provided to light emitters 18 and generated by microprocessor 15. Since the multiplexing spikes do not occur at the same time the LED enable signal is activated, the analog switch can be used to remove any multiplexing spikes. When a light emitter 18 is activated, the signal on line 27 is in a low (0 volts) logical state; when no light emitter 18 is activated, the signal on line 27 is in a high (+5 volts) logical state. Such a complement is easily provided by, for example, the use of an invertor.

Referring still to FIG. 4A, transistor 28 adjusts the reference voltage level from 0 to +5 volts (on line 27) to +5 to −12 volts, the reference voltage level at which analog switch 30 operates. Transistor 28 thus effectively converts the voltage reference level between the signal on line 27 and the operation of analog switch 30.

When a light emitter 18 is activated, line 27 and transistor 28 activate analog switch 30 so that analog switch 30 is connected between input and output (pins 3 and 9 for CD4529). On the other hand, when no light emitter 18 is activated, analog switch 30 is connected between ground and output (pins 2 and 9) and, therefore, the output signal from analog switch 30 is 0 volts.

The output signal from analog switch 30 is then fed to programmable amplifier 40 through an 8-bit digital to analog (D/A) converter 35. D/A converter 35 used in a multiplying capacity is of a type which is commercially available and well-known in the art. D/A converter 35 is connected to current to voltage converter 37 which, in turn, is connected to gain stage 42 as shown in FIG. 4A. As shown in FIG. 4A, D/A converter 35 has as one of its inputs an 8-bit gain setting 31. This gain setting signal is fed to D/A converter 35 via a data bus from microprocessor 15. Microprocessor 15 is, in turn, controlled by software which is responsive to an output signal provided by the invention. Thus, the 8-bit gain setting 31 fed to D/A converter 35 dynamically varies. The variation of the 8-bit gain setting 31 corresponds to the computer software. For best results, I prefer to use a normalization technique accomplished with computer software as disclosed in Carroll, et al, U.S. Pat. No. 4,684,801, issued Aug. 4, 1987. The contents and description of Carroll et al ('801) are incorporated by reference herein.

Multiplying D/A converter 35 is, in turn, connected to current to voltage converter 37, which consists of an operational amplifier and the corresponding resistors, capacitors, and voltage connections, as shown in detail in FIG. 4A. Current to voltage converter 37 is, in turn, connected to gain stage 42 with the corresponding resistors and capacitors shown in FIG. 4A. It will be obvious to those skilled in the art that other connections and resistive and capacitive values may be used to accomplish satisfactory results. Suitable components for use in the programmable amplifier are shown in FIG. 4A.

The output signal of gain stage 42 is communicated as an input to modulation detector 50. As shown in FIG. 4B, the output signal may be connected to pin seven of modulation detector 50. For best results, I have found that modulation detector 50 may consist of a Motorola MC1330A Low Level Video Detector. Designed for use in color and monochrome television receivers, this device comprises a balanced detector circuit that has linear amplitude and phase characteristics. When a modulation frequency of 100 kilohertz is used for the light pulses emitted by light emitters 18 when activated, I have found that good results are obtained when modulation detector 50 is connected between pins two and three by the LC circuit consisting of inductor 52 (having a value of 33 microHenrys) and capacitor 54 (having a value of 0.047 microfarads), as shown in FIG. 4B.

Figure 5A:
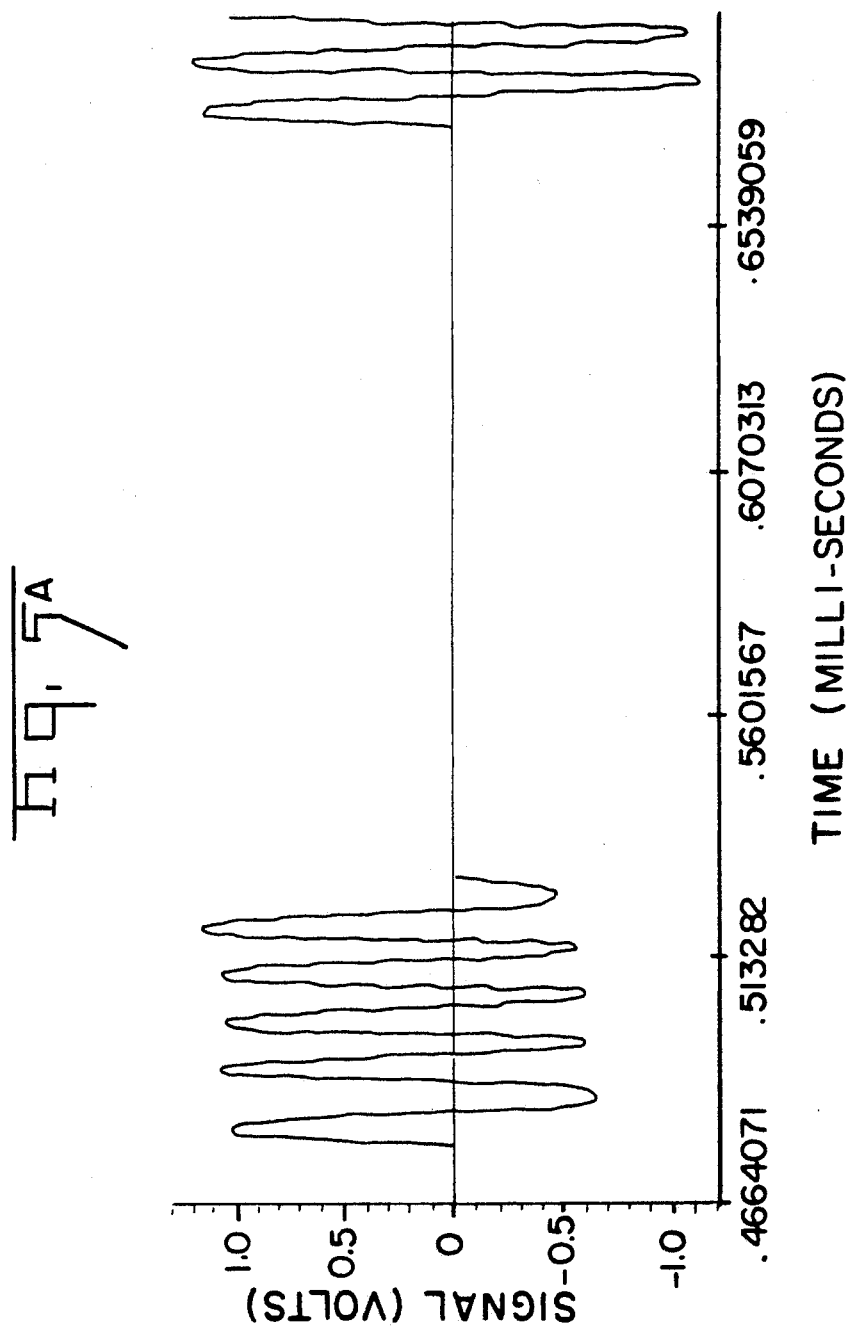
Figure 7B:
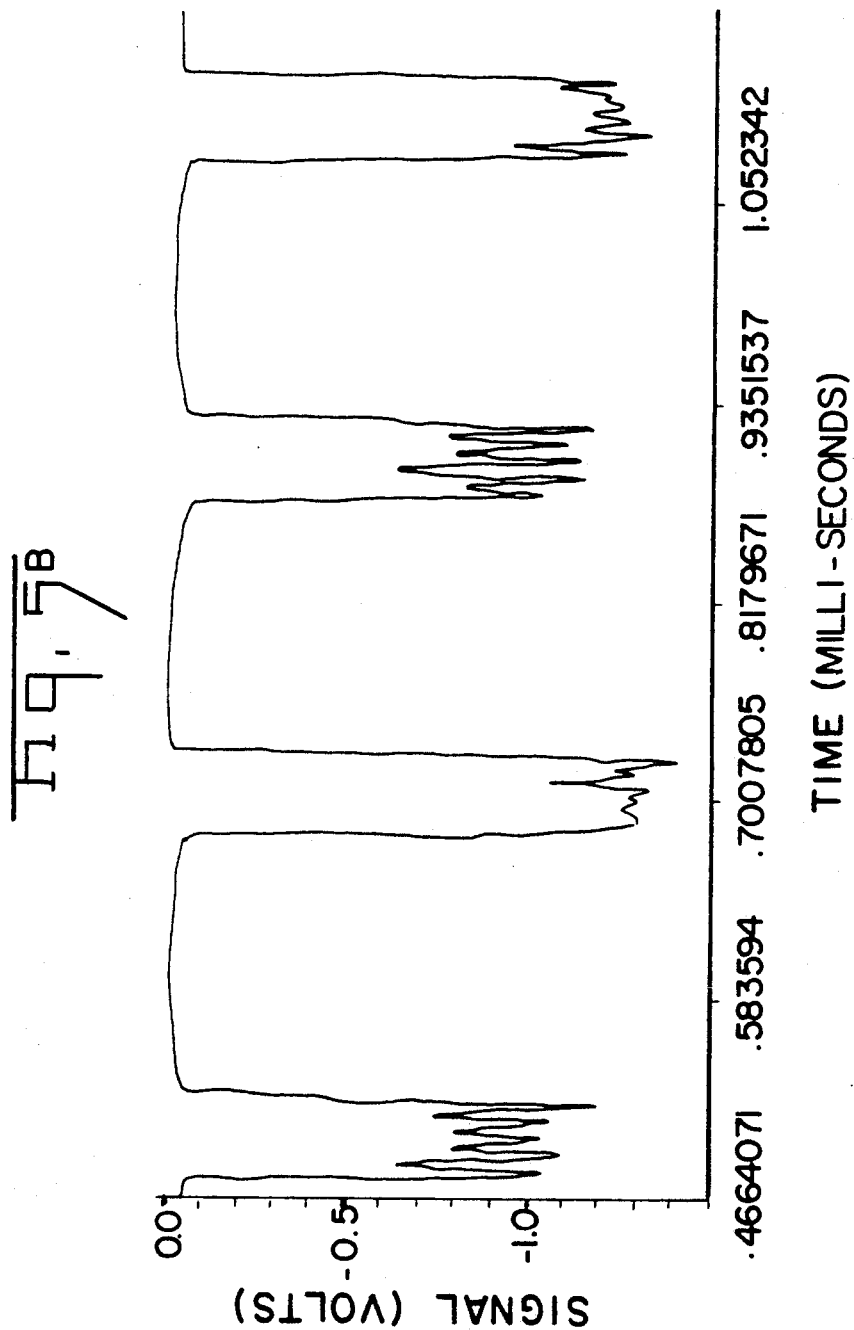

Referring now to FIG. 5A, a timing diagram is shown which indicates the output signal from gain stage 42 which is input to modulation detector 50. FIG. 5B shows the output signal from modulation detector 50 is an expanded view over time. As shown in FIG. 5B, the output of modulation detector 50 has a different amplitude and a lower frequency than the input signal shown in FIG. 5A. Note that the signal shown in FIG. 5B is easily filtered by standard techniques to obtain a well-defined output signal, as described in more detail below.

Referring again to FIG. 4B, the output signal from modulation detector 50 is input to a filter 70. Filter 70 is used to remove subharmonic information from the signal and to shape the waveform for processing by the microprocessor. Filter 70 may be a fourth order low pass filter, as shown in FIG. 4B, which consists of two second order low pass filters. Acceptable results have been achieved, however, when filter 70 consists of a single second order low pass filter with a 3 dB point of 24 kilohertz. The effect of filter 70 on the output signal of modulation detector 50 is shown in the timing diagram of FIG. 5C. As shown in FIG. 5C, the output signal consists of a series of relatively well-defined pulses, each with a duration x of approximately fifty microseconds.

The invention also utilizes an ambient light measurement circuit to measure the strength of the ambient light and, if the ambient light exceeds a preselected value, selectively disable the output signal of the invention. FIG. 4B includes a schematic diagram of such an ambient light measurement circuit. As shown in FIGS. 4A and 4B, an operational amplifier 90 is connected to the opto array in the same manner in which differential amplifier 25 is connected to the opto array of light detectors 20, as shown in FIG. 4A. The output signal of operational amplifier 90 provides a signal indicative of the strength of the ambient light. This output signal is then fed as an input into a digitally controlled analog switch 92, as shown in FIG. 4B. Analog switch 92 is of a type which is commerically available and well-known and may be of the same type as analog switch 30. Analog switch 92 operates roughly in the same manner as analog switch 30; when enabled, analog switch 92 is connected between pins 14 and 10. When analog switch 92 is disabled, it is connected between pins 13 and 10. I have found that best results are achieved when the ambient light measurement circuit and switch 92 are used to disable the output signal of the invention when the ambient light exceeds a value of 10,000 foot candles.

Referring still to FIG. 4B, the output signal of switch 92 is fed as an input to an analog to digital (A/D) converter 80 of a type which is commercially available and well-known in the art, which converts the signal from switch 92 into a digital form so that the output signal is in a form which is convenient for processing by a microprocessor.

The foregoing disclosure and description of the invention are illustrative and explanatory thereof and it will be understood by those skilled in the art that various changes in size, shape, materials, parts, and their values, as well as in the details of the illustrated constructions, may be made within the scope of the following claims without departing from the spirit of the invention.

I claim:

1. An input detection system for detecting the presence of an element in a field having a perimeter, which comprises:
   a plurality of light emitters located on said perimeter of said field;
   a plurality of light detectors located on said perimeter of said field and aligned so that, for each light emitter there is at least one corresponding light detector;
   control means, connected to said light emitters and said light detectors, for selectively activating said light emitters and said light detectors, wherein when a light emitter is activated, said at least one corresponding light detector is activated;
   means for modulating said light emitters for producing a plurality of light pulses at a preselected frequency during the activation interval of each light emitter;
   signal preconditioning means responsive to a signal from said light detectors for preconditioning said signal to produce a signal preconditioning output;
   detecting means responsive to said signal preconditioning output for detecting light pulses, wherein said pulse detecting means are substantially synchronous with said preselected frequency of said light pulses and providing pulse detecting output; and
   means responsive to said pulse detecting output for selectively filtering said pulse detecting output and providing a selectively filtered output signal,
   whereby the output of the light detecting means is progressively processed for transmission to a microprocessor.

2. The input detection system according to claim 1, which further comprises:
   means responsive to said output of said filtering means for converting said output signal of said filtering means from analog to digital form and providing an output thereof.

3. The input detection system according to claim 1, wherein said detecting means comprises a low-level video detector selectively tuned to a frequency which is substantially synchronous with said preselected frequency of said light pulses.

4. An input detection system for detecting the presence of an element in an irradiated field having a perimeter, which comprises:
   a plurality of light emitters located around said perimeter of said field;
   a plurality of light detectors located around said perimeter of said field and aligned so that, for each light emitter, there is at least one corresponding light detector;
   control means, connected to said light emitters and said light detectors, for selectively activating said light emitters and said light detectors so that, when a light emitter is activated, at least one corresponding light detector is activated;
   means for modulating each said light emitter when said light emitter is activated so that each said light emitter emits a plurality of light pulses at a preselected frequency when activated;
   differential amplification means responsive to said light detectors for amplifying a signal from at least one light detector wherein said light detector and a corresponding light emitter are activated;
   means responsive to said differential amplification means for removing voltage spikes from a signal amplified by said differential amplification means;
   programmable amplification means responsive to said spike removal means and to a control signal for selectively amplifying and normalizing an analog signal; and
   detecting means responsive to said programmable amplification means for detecting said light pulses of a preselected frequency, wherein said detecting means are substantially synchronous with said preselected frequency of said light pulses and for providing an output thereof, said detecting means being of the type operable on an analog signal; and
   said input detection system further including means for converting said output of said detecting means from analog to digital form and for providing a digital output,
   whereby the output of the light detecting means is progressively processed and converted to digital form for transmission to a microprocessor.

5. The input detection system according to claim 4, which further comprises:
   means responsive to said detecting means for selectively filtering said output of said detecting means by removing subharmonic information therefrom and shaping the waveform and providing an output thereof appropriate for transmission to said converting means and processing by said microprocessor.

6. The input detection system according to claim 4, wherein said detecting means comprises a low-level video detector which is selectively tuned to a frequency which is substantially synchronous with said preselected frequency of said light pulses.

7. The input detection system according to either claim 1 or claim 4, wherein said control means and said means for modulating said light emitters consist of a microprocessor control system.

8. An input detection system for detecting the presence of an element in an irradiated field having a perimeter, which comprises:
   a plurality of light emitters located around said perimeter of said field;
   a plurality of light detectors located around said perimeter of said field aligned so that, for each light emitter, there is at least one corresponding light detector;
   microprocessor control means, connected to said light emitters and said light detectors, for selectively activating said light emitters and said light detectors so that, when a light emitter is activated, at least one corresponding light detector is activated, and for modulating each said light emitter when said light emitter is activated so that each said light emitter emits a plurality of light pulses of a preselected frequency while activated;
   differential amplification means responsive to said light detectors for amplifying a signal from at least one of said light detectors when said light detector and a corresponding light emitter element are activated;
   means responsive to said differential amplification means for removing voltage spikes from an output signal of said differential amplification means;
   programmable amplification means, responsive to said spike removal means and to said microprocessor control means, for selectively amplifying and normalizing a signal to bring said signal within a normalized range in analog form; and
   detecting means responsive to said analog signal produced by said programmable amplification means for detecting said light pulses at a preselected frequency, wherein said detecting means are substantially synchronous with said preselected frequency of said light pulses and providing an output thereof,
   whereby the output of the light detecting means is progressively processed for transmission to a microprocessor.

9. The input detection system according to claim 8, which further comprises:
   means responsive to said detecting means for filtering an output from said detecting means and providing an output thereof.

10. The input detection system according to claim 9, which further comprises:
    means responsive to said output of said filtering means for converting said output of said filtering means from analog to digital form.

11. The input detection system according to any one of claims 1, 4, or 8, wherein said field is substantially rectangular, having four sides defining said perimeter of said field and wherein said light emitters and said light detectors are disposed around said perimeter so that said light emitters are disposed on a first side and a second side of said field and said light detectors are disposed on a third side opposite said first side and a fourth side opposite said second side.

12. The input detection system according to any one of claims 1, 4, or 8, which further comprises:
    means for measuring ambient light strength; and
    means responsive to said means for measuring ambient light strength for selectively disabling said output of said detecting means when said ambient light strength exceeds a preselected value.

13. The input detection system according to any one of claims 1, 4, or 8, wherein said light emitters comprise light emitting diodes and said light detectors comprise phototransistors.

14. A method for detecting the presence of an element in a field having a perimeter around which a plurality of light emitters and a plurality of light detectors are located, wherein said light emitters and said light detectors are aligned so that for each light emitter, there is at least one corresponding light detector, which comprises the steps of:
    selectively activating said light emitters and said light detectors, wherein when a light emitter is selectively activated, at least one corresponding light detector is activated;
    modulating each said light emitter when each said light emitter is activated so that each said light emitter emits a plurality of light pulses of a preselected frequency when activated;
    preconditioning a signal from an activated light detector by amplifying the signal from the activated light detector by a unique gain value for each pair of corresponding light emitters and light detectors to provide a preconditioned output; and
    detecting light pulses of said preselected frequency with a detector which is of the type operable on analog signals and is substantially synchronous with said preselected frequency of said light pulses, wherein the absence of said light pulses of said preselected frequency indicates an element's presence in said field, and providing an output thereof,
    whereby the output of the light detecting means is progressively processed for transmission to a microprocessor.

15. The method for detecting the presence of an element in a field according to claim 14, which further comprises:
    filtering an output signal from said detector after detecting said light pulses of said preselected frequency and providing a filtered output.

16. The method for detecting the presence of an element in a field according to claim 14, which further comprises:
    measuring ambient light strength; and
    selectively disabling said output of said detector if said ambient light strength exceeds a preselected value.

17. A method for detecting the presence of an element in a field according to claim 15, wherein said preconditioning of said signal comprises:
    differentially amplifying a signal from at least one light detector which is activated and which corresponds to an activated light emitter and providing an output thereof;
    removing voltage spikes from said output of a differentially amplified signal; and
    programmably amplifying and normalizing said output and providing an output signal thereof.

18. The method according to claim 17 which further comprises:
    converting said filtered output signal from analog to digital form.

19. The method according to claim 17 which further comprises:
    measuring ambient light strength; and
    selectively disabling said output of said detecting step if said ambient light strength exceeds a preselected value.

* * * * *